United States Patent
Elias et al.

(10) Patent No.: US 10,585,896 B2
(45) Date of Patent: Mar. 10, 2020

(54) MANAGING DATA IN RELATIONAL DATABASE MANAGEMENT SYSTEM

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

(*) Notice: Subject to any disclaimer, the term of this patent is extended or adjusted under 35 U.S.C. 154(b) by 497 days.

(21) Appl. No.: 13/795,835

(22) Filed: Mar. 12, 2013

(65) Prior Publication Data

US 2014/0280019 A1    Sep. 18, 2014

(51) Int. Cl.
*G06F 16/2455*    (2019.01)

(52) U.S. Cl.
CPC .............. *G06F 16/24554* (2019.01)

(58) Field of Classification Search
None
See application file for complete search history.

(56) References Cited

U.S. PATENT DOCUMENTS

| | | | |
|---|---|---|---|
| 5,121,494 A * | 6/1992 | Dias | G06F 16/24532 |
| 5,717,924 A * | 2/1998 | Kawai | G06F 16/289 |
| 6,092,062 A | 7/2000 | Lohman et al. | |
| 6,112,198 A * | 8/2000 | Lohman | G06F 16/24532 |
| 6,360,228 B1 * | 3/2002 | Sundara | G06F 16/2365 |
| 6,446,062 B1 * | 9/2002 | Levine | G06F 16/252 707/690 |
| 6,477,525 B1 * | 11/2002 | Bello | G06F 16/24539 |
| 6,609,131 B1 * | 8/2003 | Zait | G06F 9/5066 |
| 6,665,682 B1 * | 12/2003 | DeKimpe | G06F 16/283 |
| 6,965,891 B1 * | 11/2005 | Jakobsson | G06F 16/2264 707/714 |
| 7,020,661 B1 * | 3/2006 | Cruanes | G06F 16/2456 |
| 7,185,016 B1 * | 2/2007 | Rasmussen | G06Q 10/10 |
| 7,213,012 B2 * | 5/2007 | Jakobsson | G06F 16/2462 |
| 7,962,490 B1 * | 6/2011 | Kariv | G06Q 10/10 707/737 |
| 8,392,482 B1 * | 3/2013 | McAlister | G06F 16/1727 707/899 |
| 8,620,888 B2 * | 12/2013 | Basu | G06F 16/284 707/705 |
| 8,793,243 B2 * | 7/2014 | Weyerhaeuser | G06F 16/9038 707/718 |
| 8,793,287 B2 * | 7/2014 | Peh | G06F 16/21 707/809 |
| 8,868,563 B2 * | 10/2014 | Kariv | G06Q 10/10 707/740 |

(Continued)

*Primary Examiner* — Mariela Reyes
*Assistant Examiner* — Edward Jacobs
(74) *Attorney, Agent, or Firm* — Lowenstein Sandler LLP

(57) ABSTRACT

A mechanism for managing data in relational database management systems (RDBMS). The method includes receiving a structured query language (SQL) query to be executed on a relational database management system (RDBMS). The RDBMS includes a schema of tables divided into a plurality of partitions and the SQL query includes an operation of data to be executed on the RDBMS. The method also includes determining whether the SQL query is a valid $SQL^T$ query. The SQL query is a valid $SQL^T$ query when the SQL query includes a join operation applied to data from tables in a same partition of the plurality of partitions.

20 Claims, 4 Drawing Sheets

(56) References Cited

U.S. PATENT DOCUMENTS

| | | | |
|---|---|---|---|
| 2002/0035673 A1* | 3/2002 | Roseborough | H04L 67/2819 711/129 |
| 2002/0123993 A1* | 9/2002 | Chau | G06F 16/86 |
| 2002/0194157 A1* | 12/2002 | Zait | G06F 16/2264 |
| 2003/0055830 A1* | 3/2003 | Gutierrez-Rivas | G06F 16/2423 |
| 2003/0182276 A1* | 9/2003 | Bossman | G06F 16/217 |
| 2004/0220917 A1* | 11/2004 | Evans | G06F 16/24537 |
| 2004/0220928 A1* | 11/2004 | Evans | G06F 16/24544 |
| 2004/0225639 A1* | 11/2004 | Jakobsson | G06F 16/2462 |
| 2004/0249845 A1* | 12/2004 | Das | G06F 16/24537 |
| 2005/0038784 A1* | 2/2005 | Zait | G06F 16/24557 |
| 2005/0182762 A1* | 8/2005 | Srinivasan | G06F 16/2282 |
| 2005/0187977 A1* | 8/2005 | Frost | 707/104.1 |
| 2006/0080285 A1* | 4/2006 | Chowdhuri | G06F 16/24532 |
| 2006/0200438 A1* | 9/2006 | Schloming | G06F 16/284 |
| 2007/0073664 A1* | 3/2007 | Ahn | G06F 17/30545 |
| 2008/0189239 A1* | 8/2008 | Bawa | G06F 16/278 |
| 2008/0189240 A1* | 8/2008 | Mullins | G06F 16/25 |
| 2009/0119247 A1* | 5/2009 | Bellamkonda | G06F 16/2456 |
| 2009/0144235 A1* | 6/2009 | Bhide | G06F 16/2282 |
| 2009/0210443 A1* | 8/2009 | Barbarek | G06F 16/2282 |
| 2009/0276430 A1* | 11/2009 | Bruso | G06F 16/2343 |
| 2010/0036799 A1* | 2/2010 | Bouloy | G06F 16/24544 707/714 |
| 2010/0235344 A1* | 9/2010 | Chandrasekar | G06F 16/8365 707/713 |
| 2011/0047146 A1* | 2/2011 | Scott | G06F 16/20 707/722 |
| 2011/0302151 A1* | 12/2011 | Abadi | G06F 16/2456 707/714 |
| 2012/0041976 A1* | 2/2012 | Annapragada | G06F 16/2471 707/770 |
| 2012/0066205 A1* | 3/2012 | Chappell | G06F 16/24535 707/713 |
| 2012/0150791 A1* | 6/2012 | Willson | G06F 16/254 707/600 |
| 2012/0166424 A1* | 6/2012 | Annapragada | G06F 16/2471 707/718 |
| 2012/0166443 A1* | 6/2012 | Bloesch | G06F 16/284 707/740 |
| 2012/0246194 A1* | 9/2012 | Annapragada | G06F 16/2471 707/770 |
| 2012/0254154 A1* | 10/2012 | Rugg | G06F 16/2471 707/718 |
| 2012/0310916 A1* | 12/2012 | Abadi | G06F 16/2456 707/713 |
| 2013/0124565 A1* | 5/2013 | Annapragada | G06F 16/2471 707/770 |
| 2013/0166557 A1* | 6/2013 | Fricke | G06F 16/284 707/737 |
| 2013/0198218 A1* | 8/2013 | Wu | G06F 16/278 707/760 |
| 2013/0232133 A1* | 9/2013 | Al-Omari | G06F 16/2456 707/714 |
| 2013/0282650 A1* | 10/2013 | Zhang | G06F 16/283 707/605 |
| 2014/0101129 A1* | 4/2014 | Branish, II | G06F 16/972 707/714 |
| 2014/0181076 A1* | 6/2014 | Au | G06F 16/2456 707/714 |

\* cited by examiner

MANAGING DATA IN RELATIONAL DATABASE MANAGEMENT SYSTEM

TECHNICAL FIELD

The embodiments of the disclosure relate generally to a computer system and, more specifically, relate to systems and methods for managing data in relational database management system.

BACKGROUND

Data storage is an essential element in enterprise systems. Current approaches in data storage are leveraged to either a relational database management system (RDBMS) or a not only structured query language (NoSQL) database.

RDBMS is a database management system where data is stored in objects called tables. Tables represent a relation defined as a set of programming languages that have the same attributes. RDBMS is a collection of the data items organized as a schema of the tables from which data may be accessible. As such, RDBMS allows for applications to access data via a query, such as insert data or join data among the tables. Each RDBMS allows clients to communicate with a server via SQL language. However, RDBMS does not have capacity for storing huge quantities of data and also is not easily scalable to spread the data load over many systems.

NoSQL databases overcome the challenges of the dealing with large quantities of data and scalability faced by the RDBMS. NoSQL database is similar to traditional SQL-based relational databases, except it does not use SQL as its query language. Even though NoSQL is designed for distributed data stores for very large scale data needs, it is does not have any fixed schema and does not provide any relation among the data, thus making it difficult to query and manipulate the data across enterprises.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
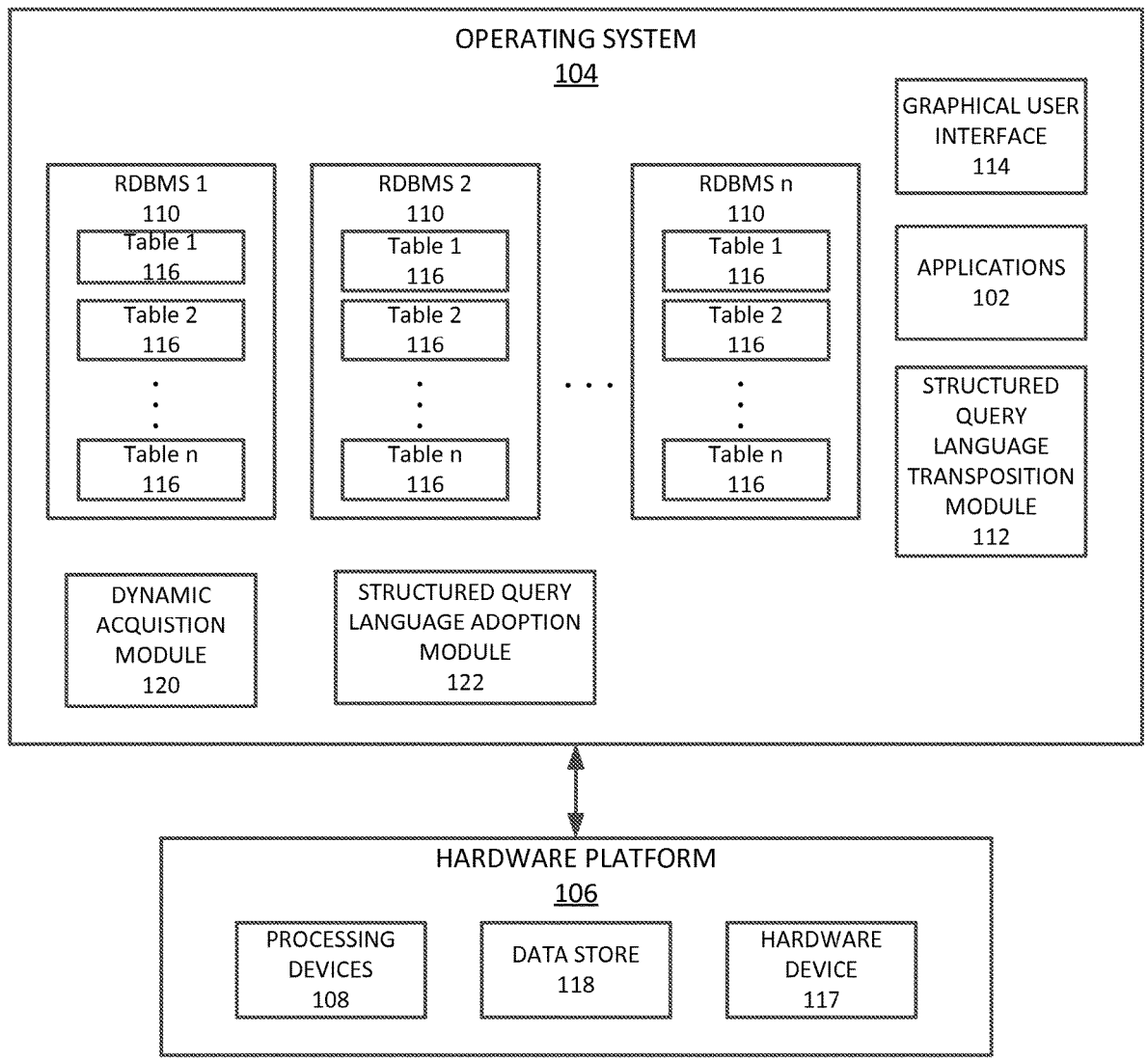
FIG. 1 is a block diagram of a computer system in which the embodiments of the present disclosure may operate.

Embodiments of the disclosure are directed to a method and system for managing data in relational database management system (RDBMS). Embodiments of the disclosure manage data based on an SQL query submitted by a client. SQL is a special-purpose programming language designed for managing data held in the RDBMS. An SQL query is SQL code written in the form of a query statement and then executed against the RDBMS. The SQL query may include, but is not limited to, select data, insert data, delete data and update data across one or more RDBMS.

In one embodiment, an RDBMS is a database in a computer system that stores data as database objects called tables. In one embodiment, the RDBMS is a collection of data items organized as a schema of the tables from which the data may be accessible. The table is a collection of related data items and it includes columns and rows. In one embodiment, the rows include each individual data item that exists in the table. The columns may include all information associated with a specific field in a table.

In one embodiment, the schema of tables in each RDBMS is divided into disjunctive partitions. A partition is a separation or division of the tables. A disjunctive partition is a separation of the schema of tables into one or more tables. In one embodiment, an SQL transposition module executed by a computer system receives the SQL query submitted by a client. In one embodiment, the SQL transposition module determines whether the SQL query is a valid $SQL^T$ query. $SQL^T$ query is a subset of the SQL. The $SQL^T$ query may be a query that does not include a join data operation between tables from different partitions.

In one embodiment, the SQL query may be a valid $SQL^T$ query when it includes a join data operation between tables that are in the same partition. The join data operation may be a process to be executed on the data stored in the tables of the RDBMS that are in the same partition. In one embodiment, the join data operation may bring together two or more entries of the data stored in the table. Such join data operation may include but not limited to select data, delete data and update data.

In one embodiment, the SQL transposition module executes the query on one or more RDBMS. The SQL transposition module may retrieve the results on the executed SQL query from the one or more RDBMS. The SQL transposition module may also send the retrieved results to the client.

In one embodiment, the SQL query may be an invalid $SQL^T$ query when it includes a join data operation between tables that are not in the same partition. The SQL transposition module 112 may (may prevent execution of the SQL query when the SQL query is the invalid $SQL^T$ query.

A method of one embodiment includes receiving a structured query language (SQL) query to be executed on a relational database management system (RDBMS). The RDBMS includes a schema of tables divided into a plurality of partitions and the SQL query includes an operation of data to be executed on the RDBMS. The method also includes determining whether the SQL query is a valid $SQL^T$ query. The SQL query is a valid $SQL^T$ query when the SQL query includes a join operation applied to data from tables in a same partition of the plurality of partitions.

The method also includes executing the SQL query on the RDBMS when it is determined that the SQL query is a valid $SQL^T$ query. The method further includes preventing execution of the SQL query when it is determined that the SQL query is an invalid $SQL^T$ query. The SQL query is an invalid $SQL^T$ query when the join operation is applied to data from tables in separate partitions of the plurality of partitions.

Prior solutions for managing data in RDBMS present several disadvantages. For example, the RDBMS itself stores data in terms of objects called tables and allows for applications to access data via a SQL query, such as insert data or join data among the tables. However, the RDBMS does not have capacity for storing large quantities of data and also is not easily scalable to spread the data load over many systems. Even though NoSQL databases overcome the challenges of the dealing with large quantities of data and the scalability issues faced by the RDBMS, it is does not allow for SQL queries, does not have any fixed schema and does not provide any relation among the data, thus making it difficult to query and manipulate the data across enterprises. Embodiments of the disclosure overcome these disadvantages by executing an SQL query of the data across the plurality of RDBMS in which the schema of tables is divided into disjunctive partitions having one or more tables such that a join data operation in the SQL query includes data operations between the tables that are in a same partition of the plurality of partitions.

FIG. 1 is a block diagram illustrating a computer system 100 in which embodiments of the present invention may be implemented. In one embodiment, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a main frame server device or any other type of server device. The computer system 100 comprises a hardware platform 106, on top of which runs an operating system (OS) 104. The OS 104 may include Microsoft™, Linux™, Solaris™, Mac™ OS or any other suitable OS for managing operations on the computer system 100.

The hardware platform 106 may include one or more processing devices 108 and a data store 118. In one embodiment, the data store 118 comprises one or more hardware or software devices, which may be located internally or externally to the computer system 100. Examples of data store 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

The OS 104 may include one or more software application programs 102 (i.e. applications). The applications 102 may be any computer-executable program capable of communicating with the OS 104. In one embodiment, the OS 104 includes a plurality of relational database management systems (RDBMS) 110 for storing data. The data in RDBMS 110 is stored as database objects called tables. A table is a collection of related data items and it includes columns and rows. In one embodiment, the rows include each individual data item that exists in the table. The columns may include all information associated with a specific field in a table. For example, a column in a CUSTOMER table may be ADDRESS, which represents a location description of the customer.

In one embodiment, the RDBMS 110 is a collection of the data items organized as a schema of the tables 116 from which the data may be accessible. Each of the RDBMS 110 may include n number of tables 116, with each table having its own primary key. In one embodiment, the primary key uniquely defines a relationship of the table 116 within the RDBMS 110. The primary key may uniquely identify each of the rows in the table 116.

The data in the table 116 of the n tables in the RDBMS 110 may include, but is not limited to, customer data, address data, product data, vendor data, price data and order data. The customer data may include columns having key, name, surname, and address_key. The address data may include columns having key, street and city. The product data may include columns having key, name, buyer_customer_key. The vendor data may include columns having key, vendor name, product_customer_key. The price data may include columns having key, price, product_customer_key. The order data may include columns having key, order, product_customer_key.

In one embodiment, the schema of tables 116 in each of the RDBMS 110 is divided into disjunctive partitions. A partition is a separation or division of the tables. A disjunctive partition is a separation of the schema of tables into one or more tables. This division of the schema of tables 116 may be same for each of the RDBMS 110. In one embodiment, the schema of the tables 116 is divided by an administrator.

Figure 2:
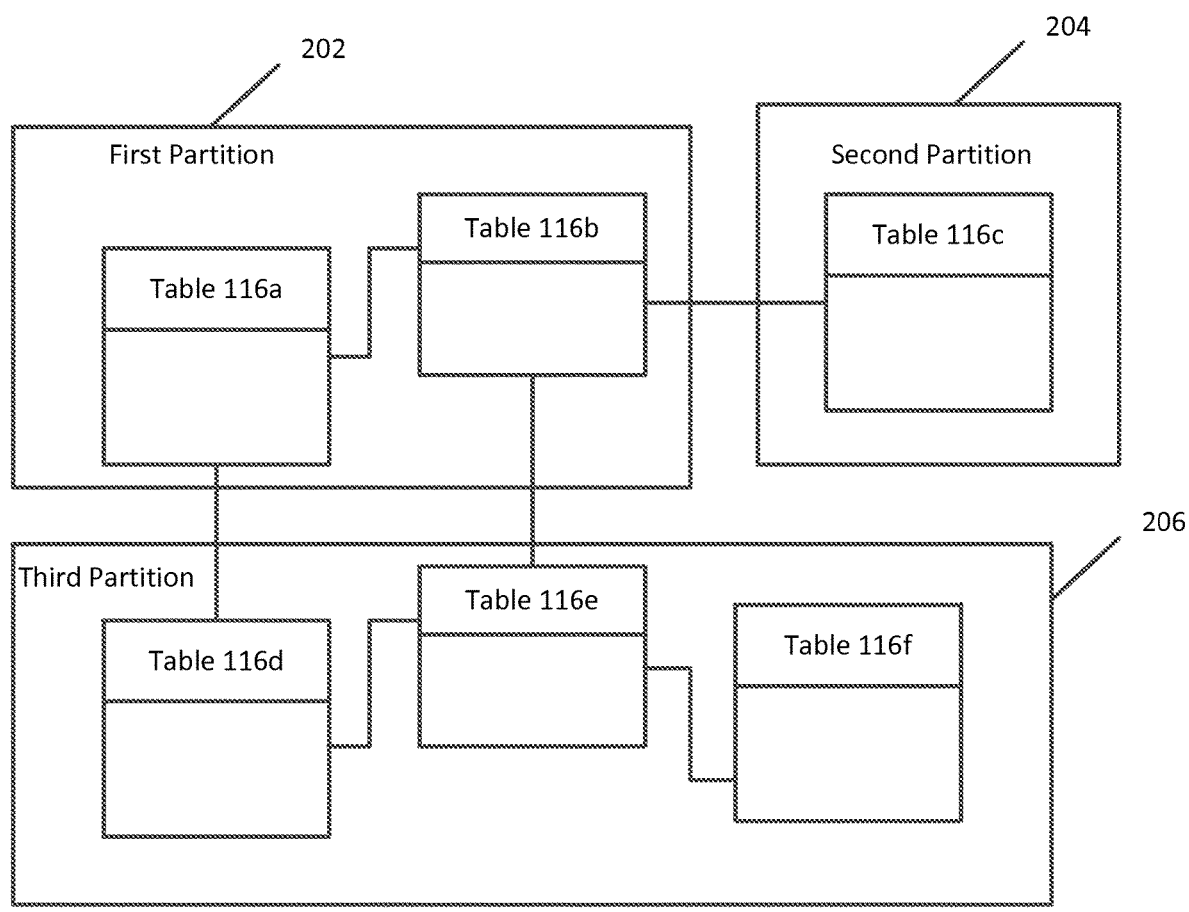
FIG. 2 illustrates an example of a partitioning of tables in the relational database management system in accordance with some embodiments.

An example of the partitioning of the schema of the tables 116 into disjunctive partitions is illustrated in FIG. 2. The tables 116 may be divided into three partitions, i.e. a first partition 202, a second partition 204 and a third partition 206. In one embodiment, the first partition 202 includes two tables 116a and 116b. As an example, the tables 116a and 116b may store the customer data and the address data respectively. In one embodiment, the second partition 204 includes one table 116c. As an example, the table 116c may store product data. In one embodiment, the third partition includes tables 116d, 116e and 116f respectively. As an example, the tables 116d, 116e and 116f may include vendor data, price data and order data respectively.

Referring back to FIG. 1, the OS 104 may also include a structured query language (SQL) transposition module 112 to manage the data of the plurality of RDBMS 110 in the computer system. The functions of the SQL transposition module 112 include, but are not limited to, query, data insert, data update, data delete, schema creation and modification, and data access control.

In one embodiment, the OS 104 receives a structured query language (SQL) query from a client. The client may be a user of the computer system 100. The client may be another device communicably coupled to the computer system 100. SQL is a special-purpose programming language designed for managing data held in a RDBMS. An SQL query is SQL code written in the form of a query statement and then executed against a database. SQL queries may perform a variety of different types of data operations, such as, but not limited to, selecting data, inserting data, updating data, deleting data or creating data objects.

In one embodiment, the SQL transposition module 112 determines whether the SQL query is a valid $SQL^T$ query. $SQL^T$ query is a subset of SQL. The SQL query may be valid $SQL^T$ query when it includes a join data operation between tables that are in the same partition. In one embodiment, a join data operation is a process to be executed on the data stored in the tables 116 of the RDBMS 110 that are in the same partition. In one embodiment, the join data operation may bring together two or more entries of the data stored in the table. Such join data operation may include but not limited to select data, delete data and update data. In one embodiment, the SQL transposition module 112 has access to the partitioning of schema of the tables 116 in the RDBMS 110. As such, the SQL transposition module 112 may determine that the certain tables 116 are in the same partition.

In one embodiment, the SQL query may be a valid $SQL^T$ query when the SQL query does not include a join data operation (a.k.a. no join data operations). In one embodiment, the no join data operation is a process to be executed on the data stored in tables 116 of the RDBMS 110 in separate partitions of the plurality of partitions. The no join data operation may not bring together the two or more entries of the data stored on the tables 116 of the RDBMS 110. Such no join data operation may include but not limited to select data, insert data deleted data and update data.

The SQL query may be invalid $SQL^T$ query when it includes a join data operation between tables that are not in the same partition. As discussed above, the SQL transposition module 112 has access to the partitioning of schema of the tables 116 in the RDBMS 110. As such, the SQL transposition module 112 may determine that certain tables 116 are not in the same partition. In one embodiment, the SQL transposition 112 may determine that the SQL query may be the invalid $SQL^T$ query. The SQL transposition 112 may stop execution of the SQL query and send an error message to the client when the SQL query is the invalid $SQL^T$ query.

The SQL transposition module 112 may determine that the SQL query is the valid $SQL^T$ query during run-time. The run-time may be the time of execution of the query. In one embodiment, the SQL transposition module 112 executes the SQL query when it is determined that the SQL query request is a valid $SQL^T$ query. In one embodiment, the SQL transposition module 112 determines whether the valid $SQL^T$ query is to be executed on a random RDBMS 110 or all the RDBMS 110. In one embodiment, the query including the join data operation of select data, delete data and update data, the SQL transposition module 112 executes the valid $SQL^T$ query on all the RDBMS 110. In one embodiment, the query including the join data operation of insert data, the SQL transposition module 112 executes the valid $SQL^T$ query on the random RDBMS 110.

In one embodiment, the SQL transposition module 112 may execute the valid $SQL^T$ query on the random RDBMS 110. SQL transposition module 112 may retrieve the results on the executed valid $SQL^T$ query from the specific RDBMS 110. The SQL transposition module 112 may also send the retrieved results to the client. The OS 104 may also include a graphical user interface (GUI) 114 configured to provide the results to the client.

As discussed above, the SQL transposition module 112 may execute the valid $SQL^T$ query in all of the RDBMS 110 when the query includes a join data operation of the select data, delete data and update data. In one embodiment, the SQL transposition module 112 may execute the valid $SQL^T$ query in all of the RDBMS 110 when the valid $SQL^T$ query query may include a no join data operation of select data, delete data, update data and insert data. As an example, the valid $SQL^T$ query query may include "SELECT name from People". This valid $SQL^T$ query may select names of all people. As such, the SQL transposition module 112 may execute the valid $SQL^T$ query query to all the RDBMS 110. The SQL transposition module 112 may retrieve the results on the executed valid $SQL^T$ query from all the RDBMS 110. The SQL transposition module 112 may merge the results retrieved from all the RDBMS 110 based on the executed $SQL^T$ query. The SQL transposition module 112 may also send the merged results to the client.

In one embodiment, the SQL query may include data operations, which include, but are not limited to, select, delete or update the data in the RDBMS 110 without any change in the primary key. As discussed above, the SQL query may be a valid $SQL^T$ query when it includes join data operations between tables that are in the same partition.

In one embodiment, the SQL query includes data operations to select the data in one or more tables 116 of the RDBMS 110. As discussed above, when the SQL query includes a no join data operation of select data, the SQL transposition module 112 executes the query in all of the RDBMS. As an example, the SQL query includes "SELECT*from CUSTOMER inner join ADDRESSES". The SQL query includes a join data operation to select the customer data and the address data. Such SQL query is a valid $SQL^T$ query since tables 116 storing the customer data and the address data are in the same partition. As an example, the table 116a storing the customer data and the table 116b storing the address data are stored in the first partition 202 as illustrated in FIG. 2. In one embodiment, the SQL transposition module 112 may retrieve the customer data from table 116a and the address table from the table 116b of the RDBMS 110. The SQL transposition 112 may send the retrieved customer data and the retrieved address data to the client.

In another embodiment, the SQL query includes join data operations to select the data in one or more tables 116 of the RDBMS 110. As an example, the SQL query includes "SELECT*from CUSTOMER inner join PRODUCT". The SQL query includes a join data operation to select the customer data and the product data. In embodiments of the disclosure, this SQL query is considered an invalid $SQL^T$ query because tables 116 storing the customer data and the product data are not in the same partition. As an example, the table 116a storing the customer data is in the first partition 202 while the table 116c storing the product data is in the second partition 206 as illustrated in FIG. 2.

In a further embodiment, the SQL query includes a no join data operations to insert the data in one or more tables 116 of the RDBMS 110. As an example, the SQL query includes "INSERT INTO PEOPLE VALUES*('FILIP', 'NGUYEN', '1')". The SQL query includes the no join data operation to insert the name in the tables that stores the customer data and has the primary key "1". In embodiments of the disclosure, this SQL query is considered a valid $SQL^T$ query since it does not bring together the two or more entries of the data stored on the tables 116 of the RDBMS 116. As an example, the table 116a storing the customer data and the table 116b storing the address data are stored in the first partition 202 as illustrated in FIG. 2. The SQL transposition module 112 selects the RDBMS 110 having the table 116a storing the customer data based on the SQL query. The SQL transposition module 112 may insert the 'FILIP' and 'NGUYEN' into the table 116a in the first partition 202 as illustrated in FIG. 2.

In one embodiment, the SQL transposition module 112 copies address data from another RDBMS 110 into the selected RDBMS 110. Specifically, the SQL transposition module 112 may copy the address data from another table 116b with the key "1" of this another RDBMS 110 into the table 116b (storing the address data) of the selected RDBM 110.

In one embodiment, the SQL query may update the data in the RDBMS 110. Similar to the insertion of the data, the SQL transposition module 112 may select one or more of the RDBMS 110 based on the data to be updated. As an example, the SQL query may include "UPDATE PERSON set FIRST_NAME='Filip' where ID=5." As discussed above, when the SQL query is an update data, the SQL transposition module 112 executes the query in all of the RDBMS 110.

In one embodiment, the OS 104 includes a dynamic acquisition module 120. The dynamic acquisition module 120 may determine an amount of storage space of all the RDBMS 110. The dynamic acquisition module 120 may determine whether the amount of storage space of all the RDBMS 110 exceeds a threshold limit. The threshold limit may be an amount of storage space left in the RDBMS. In one embodiment, the dynamic acquisition module 120 may acquire additional RDBMS 110 if all the RDBMS 110 exceeds their threshold limit. The dynamic acquisition module 120 may acquire additional RDBMS when the query includes insert data into one or more tables 116 in the RDBMS 110.

In one embodiment, the OS 104 includes a SQL adoption module 122. The SQL adoption module 122 may edit the valid $SQL^T$ query prior to being executed on the RDBMS 110. Some of the RDBMS 110 may have different rules and require edits on the valid $SQL^T$ query. In one embodiment, the valid $SQL^T$ query is edited because an RDBMS 110 may include a feature unique to itself and is not common among other RDBMS 110. For example, one of the RDBMS 110 may require ticks for the apostrophes and another RDBMS 110 may require quotation for the apostrophes.

Figure 3:
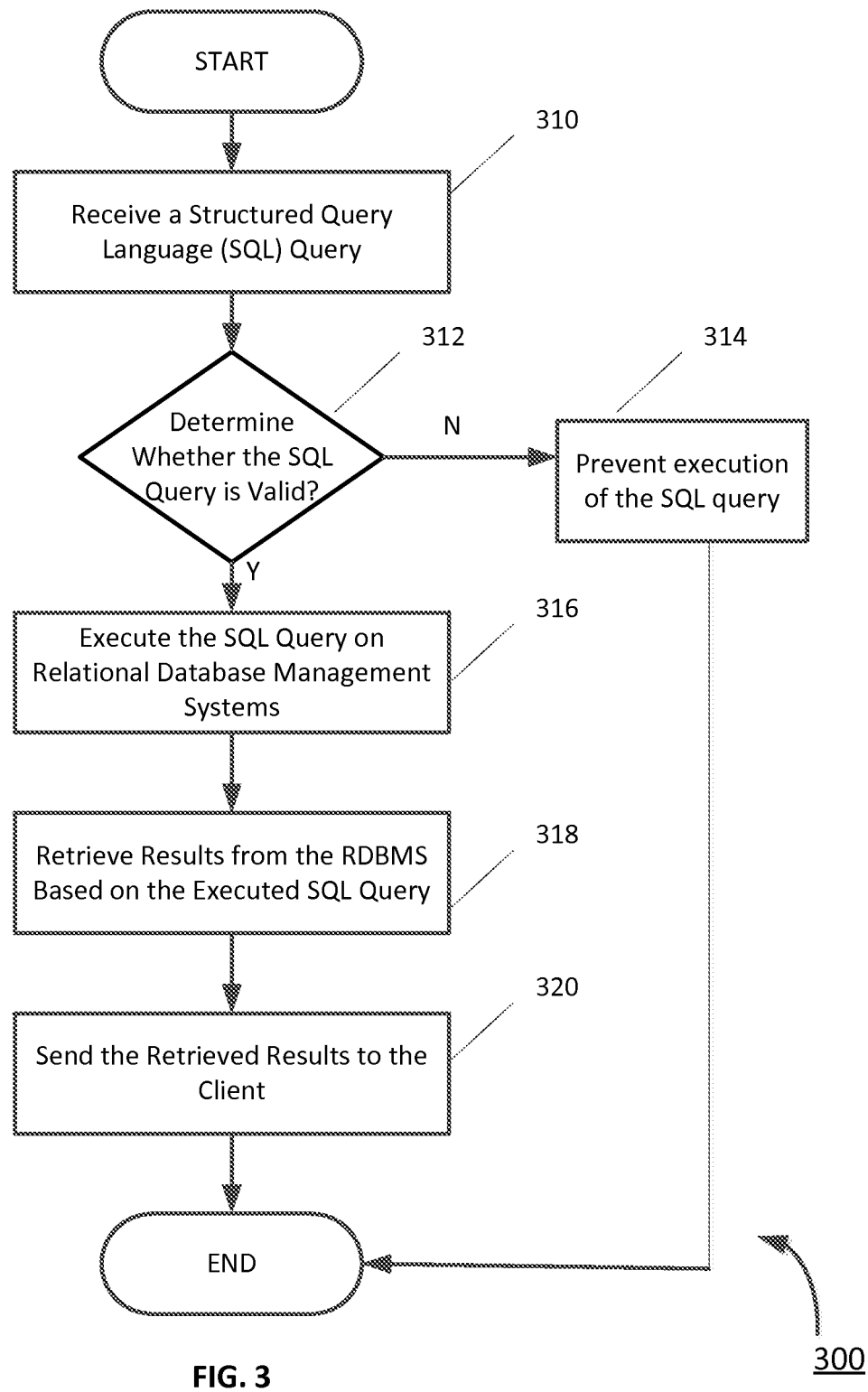
FIG. 3 illustrates a flow diagram of one embodiment of a method for managing data in relational database management system.

FIG. 3 is a flow diagram illustrating a method 300 for managing data in a relational database management system (RDBMS) according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by SQL transposition module 112 of FIG. 1 executing in a computing device, such as the computer system 100 of FIG. 1.

Referring to FIG. 3, method 300 begins at block 310 where an SQL query is received at the OS 104. In one embodiment, the SQL query is submitted by a client. As discussed above, client may be a user of the computer system 100. Also as discussed above, client may be another device communicably coupled to the computer system 100. As discussed above, the SQL query may include select, delete or update the data in the RDBMS 110 without any change in the primary key.

In one embodiment, the SQL query is to be executed on one or more of the RDBMS 110. As discussed above, the RDBMS 110 is a collection of the data items organized as a schema of the tables 116 from which the data may be accessible. Each of the RDBMS 110 may include n number of tables 116 with each table having its own primary key. In one embodiment, the primary key uniquely defines a relationship of the table 116 within the RDBMS 110. Also as discussed above, the schema of tables 116 is divided into partitions. Each of the partitions may include at least one table 116.

At block 312, the SQL transposition module 112 determines whether the SQL query is a valid $SQL^T$ query. In one embodiment, the SQL transposition determines whether the SQL query is a valid $SQL^T$ query during run-time. AS discussed above, the SQL query may be considered a valid $SQL^T$ query when it includes a join operation between tables that are in the same partition. In one embodiment, a join data operation is a process to be executed on the data stored in the tables 116 of the RDBMS 110 that are in the same partition. In one embodiment, the join data operation may bring together two or more entries of the data stored in the table. Such join data operation may include but not limited to select data, delete data and update data.

In one embodiment, the SQL query may be a valid $SQL^T$ query when the SQL query does not include a join data operation (a.k.a. no join data operations) In one embodiment, the no join data operation is a process to be executed on the tables 116 of the RDBMS 110 which may not bring together the two or more entries of the data stored on the tables 110 of the RDBMS 116. Such no join data operation may include but not limited to select data, insert data deleted data and update data.

As discussed above, the SQL query may be considered an invalid $SQL^T$ query when it includes join operations between tables that are not in the same partition. At block 314, the SQL transposition module 112 prevents execution of the SQL query. In one embodiment, the SQL transposition module 112 to send an error message to the client when the SQL query is the invalid $SQL^T$ query, when it is determined at block 312 that the SQL query is not a valid $SQL^T$ query.

At block 316, the SQL transposition module 112 executes the SQL query on the RDBMS 110 when it is determined at block 312 that the SQL query is a valid $SQL^T$ query. At block 318, the SQL transposition module 112 retrieves results from RDBMS 110 based on the executed SQL request. At block 320, SQL transposition module 112 sends the retrieved results to the client.

Figure 4:
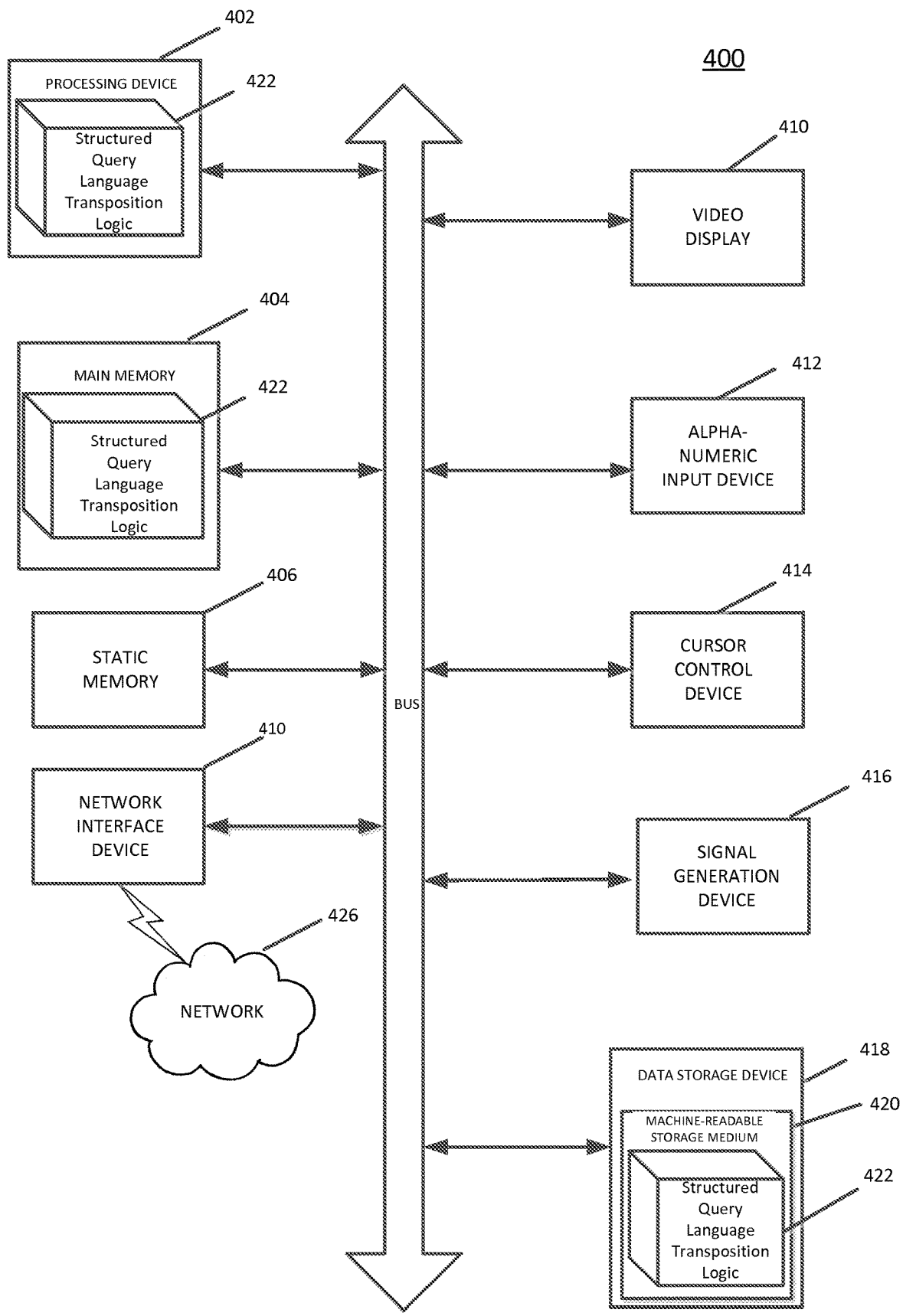
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute structured query language transposition logic 422 for performing the operations and steps discussed herein. In one embodiment, structured query language transposition module 112 described with respect to FIG. 1 performs the structured query language transposition logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. structured query language transposition logic 422) embodying any one or more of the methodologies of functions described herein, such as method 300 for managing data in relational database management systems described with respect to FIG. 3. The structured query language transposition logic 422 may also reside, completely or at least partially, within the memory 406 and/or within the processing device 402 during execution thereof by the computer system 400; the memory 406 and the processing device 402 also constituting machine-accessible storage media. In one embodiment, structured query language transposition logic 422 is the same as structured query language transposition module 112 of FIG. 1.

The machine-readable storage medium 420 may also be used to store the structured query language transposition processing logic 422 persistently containing methods that call the above applications. While the machine-readable storage medium 420 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", 'storing", "determining", "executing", "inserting", "deleting" "selecting" "updating" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving, by a processing device, a structured query language (SQL) query to be executed on at least one of a plurality of relational database management (RDBM) systems, wherein each of the RDBM systems comprises a fixed schema of tables divided into a plurality of disjunctive partitions, each partition of the plurality of disjunctive partitions having one or more tables of the fixed schema of tables, each table of the one or more tables comprising one or more columns of data and rows of data of the RDBM system, the SQL query comprising an operation of data to be executed on the RDBM system, wherein a respective table of the fixed schema of tables is associated with a respective primary key of a plurality of primary keys identifying the rows of data, and wherein the primary key defines a relationship of the respective table within the RDBM systems;
determining, by the processing device, whether the SQL query is a valid $SQL^T$ query or an invalid $SQL^T$ query, wherein the SQL query is the valid $SQL^T$ query responsive to the SQL query comprising a join operation applied to data from tables in a same partition of the plurality of disjunctive partitions or a no join operation applied to data from tables in any partition of the RDBM system, and wherein the SQL query is the invalid $SQL^T$ query responsive to the SQL query comprising a join operation to apply to the data from the tables in more than one of the plurality of disjunctive partitions;
in response to determining that the SQL query is a valid $SQL^T$ query, identifying, by the processing device, a type of operation of the SQL query, wherein the type of operation comprises one of a join operation to select, a join operation to delete, a join operation to update, a join operation to insert, a no join operation to select, a no join operation to delete, a no join operation to update, or a no join operation to insert;
executing the SQL query on each of the plurality of RDBM systems in response to determining that the SQL query is one of the join operation to select, the join operation to delete, the join operation to update, the no join operation to select, the no join operation to delete, the no join operation to update, or the no join operation to insert; and
executing the SQL query on a random RDBM system of the plurality of RDBM systems in response to determining that the SQL query is a join operation to insert.

2. The method of claim 1 wherein the no join operation is applied to the data from the tables in more than one of the partitions of the plurality of disjunctive partitions.

3. The method of claim 1 further comprising executing the SQL query on the RDBM systems in response to determining that the valid $SQL^T$ query is to be executed on the plurality of RDBM systems.

4. The method of claim 1 wherein the type of operation of the SQL query comprises at least one of selecting of the data, deleting the data, inserting the data or updating the data in at least one of the RDBM systems.

5. The method of claim 1 further comprising retrieving results of the valid $SQL^T$ query from at least one of the RDBM systems.

6. The method of claim 5 further comprising sending the retrieved results to a client.

7. A system comprising:
a memory; and
a processing device, operatively coupled to the memory to:
receive a structured query language (SQL) query to be executed on at least one of a plurality of relational database management (RDBM) systems, wherein each of the RDBM systems comprises a fixed schema of tables divided into a plurality of disjunctive partitions, each partition of the plurality of disjunctive partitions having one or more tables of the fixed schema of tables, each table of the one or more tables comprising one or more columns of data of the RDBM system, the SQL query comprising an operation of data to be executed on the RDBM system, wherein a respective table of the fixed schema of tables is associated with a respective primary key of a plurality of primary keys identifying the rows of data, and wherein the primary key defines a relationship of the respective table within the RDBM systems;
determine whether the SQL query is a valid $SQL^T$ query or an invalid $SQL^T$ query, wherein the SQL query is the valid $SQL^T$ query responsive to the SQL query comprising a join operation applied to data from tables in a same partition of the plurality of disjunctive partitions or a no join operation applied to data from tables in any partition of the RDBM system, and wherein the SQL query is the invalid $SQL^T$ query responsive to the SQL query comprising a join operation to apply to the data from the tables in more than one of the plurality of disjunctive partitions;
in response to determining that the SQL query is a valid $SQL^T$ query, identify a type of operation of the SQL query, wherein the type of operation comprises one of a join operation to select, a join operation to delete, a join operation to update, a join operation to insert, a no join operation to select, a no join operation to delete, a no join operation to update, or a no join operation to insert;
execute the SQL query on each of the plurality of RDBM systems in response to determining that the SQL query is one of the join operation to select, the join operation to delete, the join operation to update, the no join operation to select, the no join operation to delete, the no join operation to update, or the no join operation to insert; and
execute the SQL query on a random RDBM system of the plurality of RDBM systems in response to determining that the SQL query is a join operation to insert.

8. The system of claim 7 wherein the no join operation is applied to the data from the tables in more than one of the partitions of the plurality of disjunctive partitions.

9. The system of claim 7 wherein the type of operation of the SQL query comprises one of selecting of the data, deleting the data, inserting the data or updating the data in at least one of the RDBM systems.

10. The system of claim 7 wherein the processing device is to retrieve results of the valid $SQL^T$ query from at least one of the RDBM systems.

11. A non-transitory machine-readable storage medium comprising data, when accessed by a processing device, cause the processing device to:
receive a structured query language (SQL) query to be executed on at least one of a plurality of relational database management (RDBM) systems, wherein each of the RDBM systems comprises a fixed schema of tables divided into a plurality of disjunctive partitions, each partition of the plurality of disjunctive partitions having one or more tables of the fixed schema of tables, each table of the one or more tables comprising one or more columns of data of the RDBM system, the SQL query comprising an operation of data to be executed on the RDBM system, wherein a respective table of the fixed schema of tables is associated with a respective primary key of a plurality of primary keys identifying the rows of data, and wherein the primary key defines a relationship of the respective table within the RDBM systems;

determine whether the SQL query is a valid $SQL^T$ query or an invalid $SQL^T$ query, wherein the SQL query is the valid $SQL^T$ query responsive to the SQL query comprising a join operation applied to data from tables in a same partition of the plurality of disjunctive partitions or a no join operation applied to data from tables in any partition of the RDBM system, and wherein the SQL query is the invalid $SQL^T$ query responsive to the SQL query comprising a join operation to apply to the data from the tables in more than one of the plurality of disjunctive partitions;

in response to determining that the SQL query is a valid $SQL^T$ query, identify a type of operation of the SQL query, wherein the type of operation comprises one of a join operation to select, a join operation to delete, a join operation to update, a join operation to insert, a no join operation to select, a no join operation to delete, a no join operation to update, or a no join operation to insert;

execute the SQL query on each of the plurality of RDBM systems in response to determining that the SQL query is one of the join operation to select, the join operation to delete, the join operation to update, the no join operation to select, the no join operation to delete, the no join operation to update, or the no join operation to insert; and execute the SQL query on a random RDBM system of the plurality of RDBM systems in response to determining that the SQL query is a join operation to insert.

12. The non-transitory machine-readable storage medium of claim 11, wherein the no join operation is applied to the data from the tables in separate partitions of the plurality of disjunctive partitions.

13. The non-transitory machine-readable storage medium of claim 11, wherein the type of operation of the SQL query comprises one of selecting of the data, deleting the data, inserting the data or updating the data in at least one of the RDBM systems.

14. The non-transitory machine-readable storage medium of claim 11, wherein the processing device is to retrieve results of the valid $SQL^T$ query from at least one of the RDBM systems.

15. The method of claim 1, further comprising in response to determining that the SQL query is an invalid $SQL^T$ query, determining, by the processing device, to stop execution of the invalid $SQL^T$ query.

16. The method of claim 1, further comprising:
acquiring an additional RDBM system in response to determining that an amount of storage space of each of the plurality of RDBM systems exceeds a threshold limit.

17. The system of claim 7, wherein the processing device is further to determine that the SQL query is an invalid $SQL^T$ query, determining, by the processing device, to stop execution of the invalid $SQL^T$ query.

18. The system of claim 7, wherein the processing device is further to acquire an additional RDBM system in response to determining that an amount of storage space of each of the plurality of RDBM systems exceeds a threshold limit.

19. The non-transitory machine-readable storage medium of claim 11, wherein the processing device is further to determine that the SQL query is an invalid $SQL^T$ query, determining, by the processing device, to stop execution of the invalid $SQL^T$ query.

20. The non-transitory machine-readable storage medium of claim 11, wherein the processing device is further to acquire an additional RDBM system in response to determining that an amount of storage space of each of the plurality of RDBM systems exceeds a threshold limit.

* * * * *